March 15, 1927. 1,621,404
J. W. HARVEY
FALSE ROOF FOR MOTOR VEHICLES
Filed April 15, 1925  2 Sheets-Sheet 1
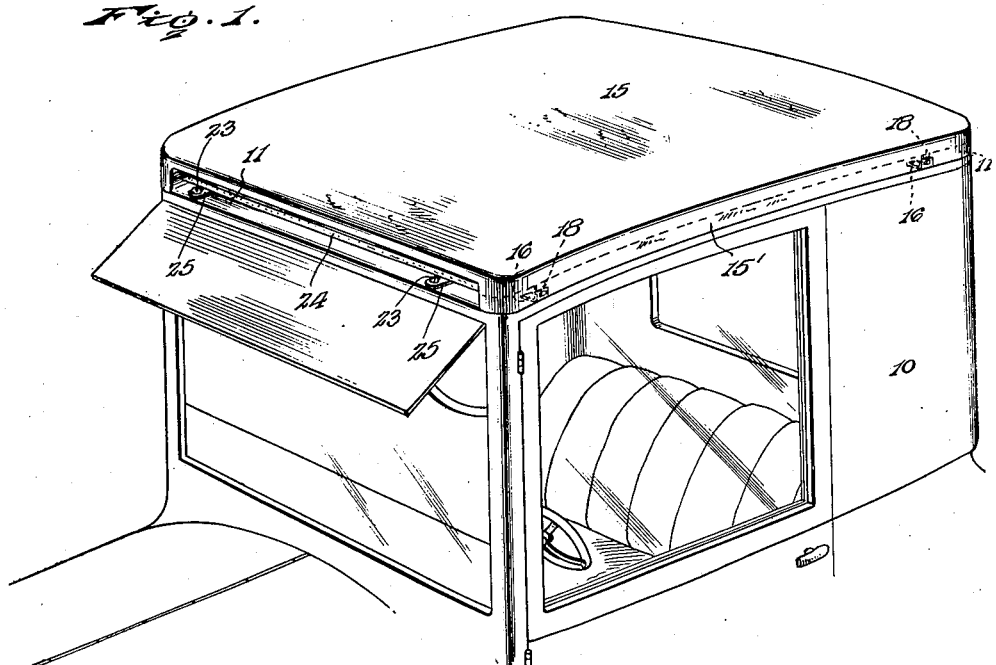
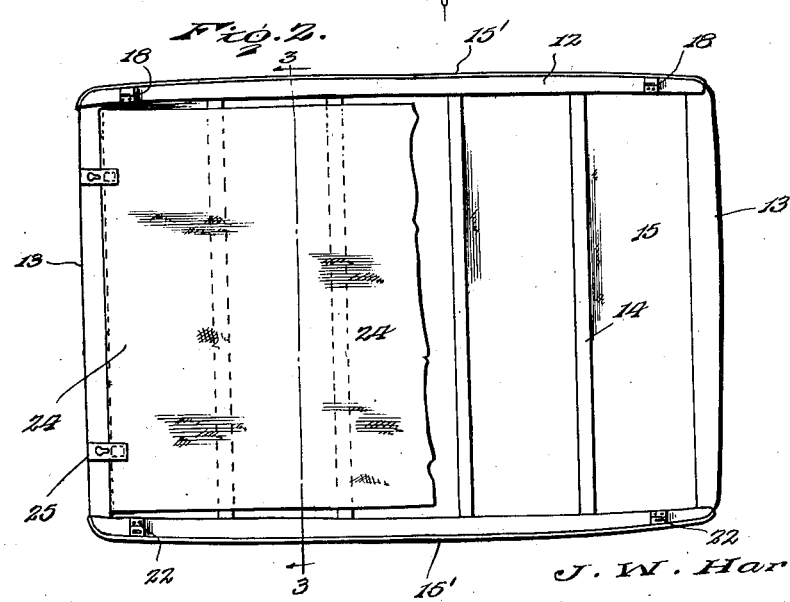
Inventor
J. W. Harvey.
By Louy Lacey Attorneys March 15, 1927.　　　J. W. HARVEY　　　1,621,404
FALSE ROOF FOR MOTOR VEHICLES
Filed April 15, 1925　　　2 Sheets-Sheet 2
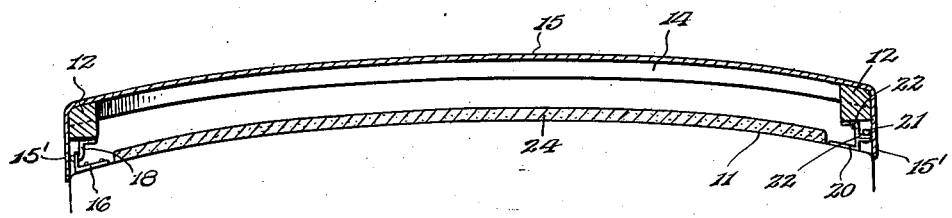
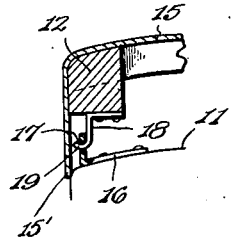 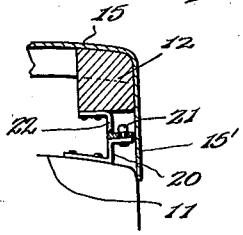
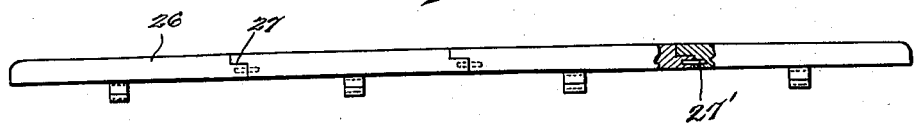
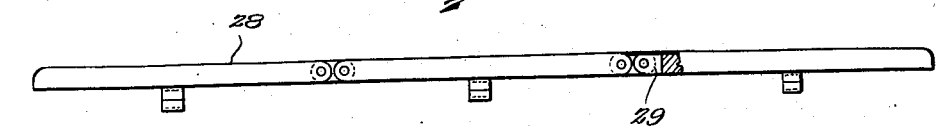
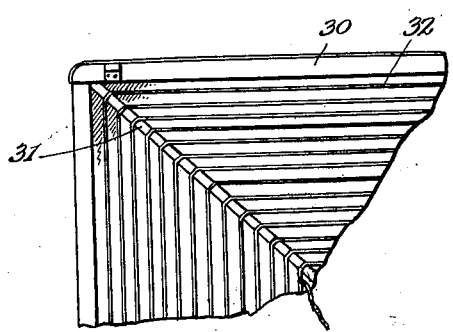
Inventor
J. W. Harvey.
By Lacey & Lacey, Attorneys Patented Mar. 15, 1927.

1,621,404

UNITED STATES PATENT OFFICE.

JOHN W. HARVEY, OF DENVER, COLORADO.

FALSE ROOF FOR MOTOR VEHICLES.

Application filed April 15, 1925. Serial No. 23,325.

This invention relates to an improved false roof for motor vehicles and seeks, among other objects, to provide a covering for shading the roof of a vehicle whereby to reduce the temperature within the vehicle.

The invention seeks, as a further object, to provide a false roof which may be readily applied or removed, and wherein air will be permitted to freely circulate between the false roof and the roof of the vehicle for cooling the vehicle roof.

A still further object of the invention is to provide a false roof embodying a number of moisture pads arranged between the false roof cover and the roof of the vehicle so that the air circulating between said cover and the vehicle roof will evaporate the moisture from said pads and thereby effect a pronounced cooling action through such evaporation.

And the invention seeks, as a still further object, to provide a device which will be neat and attractive in appearance and which will be well adapted for general use.

Other and incidental objects will appear hereinafter.

In the accompanying drawings:

Figure 1 is a perspective view showing a conventional motor vehicle equipped with my improved false roof.

Figure 2 is a bottom plan view showing the roof in detail.

Figure 3 is a transverse sectional view particularly showing the disposition of the moisture pads employed.

Figures 4 and 5 are detail sectional views particularly showing the mounting of the false roof.

Figure 6 is an edge elevation showing a slight modification of the invention.

Figure 7 is a view similar to Figure 6, showing a further slight modification.

Figure 8 is a fragmentary bottom plan view showing a still further modified structure.

Referring now more particularly to the drawings, I have shown the present invention in connection with a conventional motor vehicle having a closed body 10, the roof of which is indicated at 11. However, it is to be understood that the invention is equally applicable for use in connection with the tops of vehicles of the open type and I do not, therefore, wish to be limited in this regard but, for the purposes of the present disclosure, will describe the invention in connection with the closed body 10 of the vehicle shown.

As particularly illustrated in Figure 2, I employ a frame including side rails 12 which may be of wood, and extending transversely between the side rails, in parallel relation, are end bows or struts 13 as well as intermediate bows or struts 14, all of which may also be of wood. Overlying the frame is a moisture-proof covering 15 of any approved material. This cover is, however, preferably of the same flexible material prevalently employed to form the roof coverings of motor vehicle bodies or tops and may be tacked or otherwise secured to the side rails 12 and end bows 13 of the frame.

As shown in Figures 1 and 3 of the drawings, the false roof is of the same outside dimensions as the roof 11 of the vehicle top 10 and is mounted above the roof 11 in registering relation thereto. In any instance where the device is constructed for use in connection with the top of a vehicle of the open type, the false roof will, of course, be of a length equal to the length of the roof of the top and will be mounted to register therewith, as suggested in the present disclosure. A neat appearance of the device, when applied, is thus had, and if the roof of either the open or closed vehicle is long, the false roof may be divided transversely into a number of mating sections so as to facilitate the handling of the device. Fixed to the roof 11 at one side thereof are, as shown in detail in Figure 4, angle-shaped hinge plates 16, the upstanding ends of which are provided with slots 17, and fixed to one side rail of the frame of the false roof are angle-shaped hinge plates 18, the downwardly extending ends of which are formed with laterally curved hooks 19 extending freely through the slots 17 and hingedly mounting the false roof. Fixed to the roof 11 adjacent its opposite side are spaced Z-shaped brackets 20, the free ends of which are equipped with appropriate turn-buttons 21, and fixed to the adjacent side rail of the frame of the false roof to rest against the brackets 20, are similar brackets 22. The free ends of the brackets 22 are apertured to receive the buttons 21 so that, as will be seen, after the false roof has been swung down into position, the buttons 21 may be turned for locking the false roof in place. Furthermore, this construction provides an arrangement whereby the false roof may be readily swung up to expose the roof of the vehicle while, when so desired, the hooks 19 may be slipped from the slots 17 of the brackets 16 and the false roof displaced. As suggested in Figure 1, the false roof is slightly curved longitudinally to conform to the curvature of the roof 11 and is supported in uniform spaced relation with respect to the roof 11, while, as shown in Figure 3, the top covering 15 is extended at the side rails 12 to form side flaps 15' overlying and concealing the brackets and plates mounting the false roof.

Fixed to the forward end of the roof of the vehicle body are, as particularly shown in Figure 1, transversely spaced screws or studs 23 and removably secured by said studs is a moisture pad 24 resting upon said roof. The pad may be of felt or other approved material and is provided at its forward end with straps 25 removably engaging over the studs 23 for anchoring the pad thereto. The pad extends to the rear end of the roof 11 and also closely approaches the side edges thereof.

As will now be seen in view of the foregoing, the false roof will shade the roof 11 of the vehicle body and will thereby tend to reduce the temperature within the vehicle body. Furthermore, in mounting the false roof in spaced relation to the roof 11, provision is made whereby air may freely circulate therebetween. Accordingly, when the pad 24 is saturated with water, the air circulating between the false roof and the roof of the vehicle will cause the moisture to evaporate from the pad and this evaporation will, of course, further tend to reduce the temperature within the vehicle body. The device will, therefore, appreciably contribute toward the more comfortable riding conditions of the vehicle.

In Figure 6 of the drawings, I have illustrated a slight modification of the invention particularly adapting the false roof for use in connection with long vehicle tops. In this modified structure, the frame of the false roof is formed of a plurality of mating sections 26 to extend from side to side of the roof of the vehicle and, as shown these sections are preferably provided with lap joints, as indicated at 27. Each of the sections is preferably equipped with a pair of the plates 18 and 22, as illustrated in connection with the prior embodiment of the invention, so that the sections may be separately applied and, as will be understood, each of the sections includes a pair of side rails connected by a pair of end rails like the frame of the prior embodiment of the invention, so as to provide a rigid structure. If desired, dowel pins 27' may be employed to hold the sections together. Otherwise, this modification of the invention is identical with the structure first described.

In Figure 7 of the drawings, I have illustrated a further slight modification of the invention which is also intended for use in connection with long vehicle roofs. In this modification, the frame of the false roof is formed of a plurality of mating sections 28 similar to the sections 26 of Figure 6, and in order that the frame of the false roof may be readily positioned to conform to the longitudinal contour of the roof of the vehicle, the sections 28 are connected with each other by hinge plates 29. Otherwise, this modified structure is identical with the embodiment of the invention first described.

In Figure 8 of the drawings, I have illustrated a still further modified structure wherein the false roof is provided with a frame 30 like the frame of the false roof first described with the exception that the frame 30 is provided with diagonal struts 31, and secured to the frame beneath the roof cover is a wire backing 32 for said cover. The backing 32 will thus support the cover between the struts of the frame and, as suggested in the drawings, is arranged in the form of an aerial loop so that said backing may, if desired, be employed as an aerial for a radio set carried in the vehicle to which the false roof is applied.

Having thus described the invention, what I claim is:

In combination with the main roof of a vehicle and an auxiliary roof, comprising a frame of rigid material and a flexible covering, stretched over and extended at opposite sides to form flaps, of bracket members secured to opposite sides of the main roof, complemental bracket members secured to opposite sides of the frame of the auxiliary roof, said bracket members supporting the roof, auxiliary roof spaced above the main roof, and fastening means for securing the bracket members to hold the auxiliary roof in place, the supporting brackets and fastening means being concealed by the said flaps.

In testimony whereof I affix my signature.

JOHN W. HARVEY. [L. S.]